UNITED STATES PATENT OFFICE.

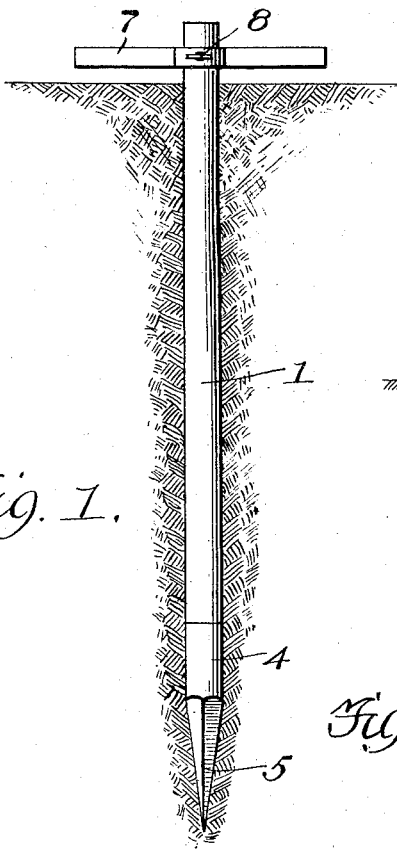
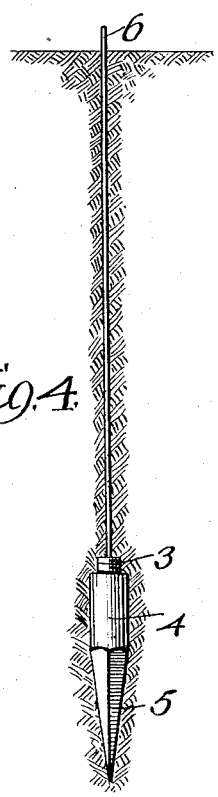
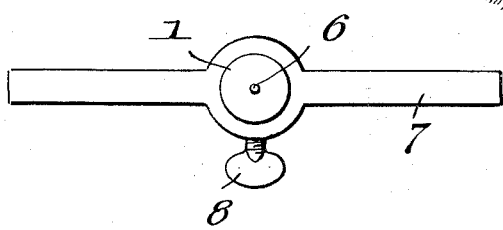
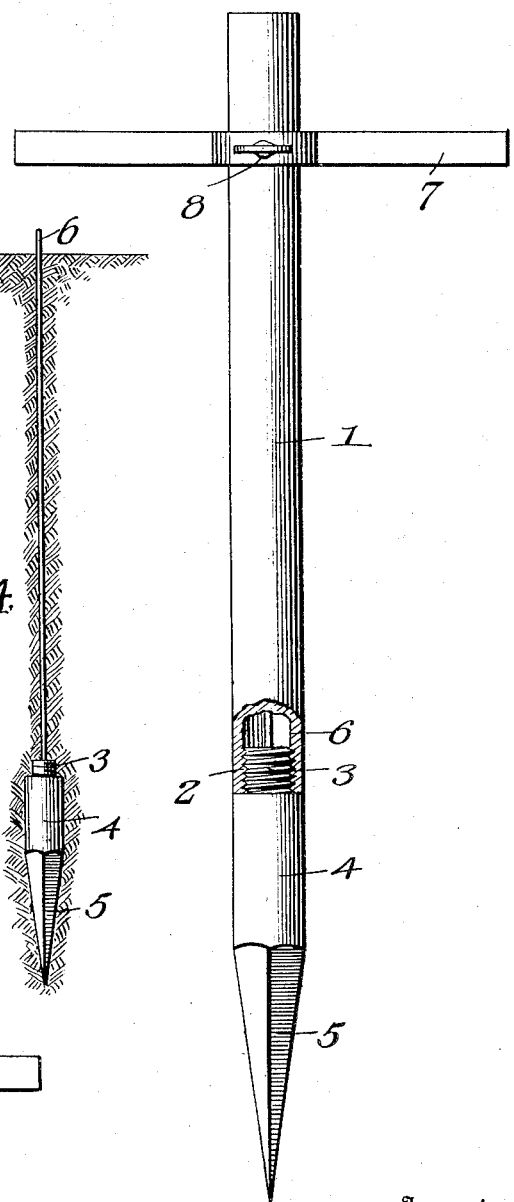

WILLIAM H. CURRY, OF LAKE CITY, IOWA.

GROUND-CONNECTOR.

1,154,099.  Specification of Letters Patent.  Patented Sept. 21, 1915.

Application filed February 25, 1913.  Serial No. 750,643.

*To all whom it may concern:*

Be it known that I, WILLIAM H. CURRY, a citizen of the United States, residing at Lake City, in the county of Calhoun and State of Iowa, have invented new and useful Improvements in Ground-Connectors, of which the following is a specification.

This invention relates to certain novel and useful improvements in electric current carrying conductors and has particular application to a ground connector whereby the ground conductors of an electric current transmission line may be effectively and efficiently connected to the ground to form the return side of the circuit.

In carrying out the present invention, it is my purpose to provide a ground connector for electric current carrying conductors whereby telephone, telegraph, electric lighting and other lines may be effectively grounded and which may be readily and easily embedded in the earth.

It is also my purpose to produce a ground connector for electric current carrying conductors which will embrace the desired features of simplicity, efficiency, durability and convenience coupled with cheapness of cost in manufacture and marketing and which may be readily and conveniently installed in the line.

With the above and other objects in view, the invention consists in the construction, combination and arrangement of parts hereinafter set forth in and falling within the scope of the claim.

In the accompanying drawing, Figure 1 is a sectional view through a portion of the earth showing my improved ground connector and conductor embedded therein. Fig. 2 is a view in elevation of the connector, parts being broken away. Fig. 3 is an end view thereof. Fig. 4 is a fragmentary sectional view through the ground showing the ground connector embedded therein and the forcing implement removed.

Referring now to the accompanying drawing in detail, the numeral 1 indicates a cylindrical tube preferably composed of metal and of any suitable dimensions, such tube having one end thereof threaded interiorly as at 2 and designed to receive the exteriorly threaded nipple 3 carried upon one end of a metallic rod or ground plug 4 having a pointed extremity 5 adapted to be inserted in the earth or ground. The conductor in conjunction with which my ground connector is employed is indicated at 6 and is shown as passed through the tube 1 and has the free end thereof soldered or otherwise appropriately connected to the rod 4, the nipple 3 on the rod being threaded into the end 2 of the tube subsequent to this connection. When the rod and tube are thus connected a unitary structure is provided which may be readily and easily passed into the ground.

My ground connector, it will be noted not only functions as a means for connecting electric current transmission conductors to the ground but also acts as a conductor itself thereby insuring a direct and positive connection between the current carrying wire and the ground.

In order to embed or insert the conductor in the ground, I preferably moisten the earth and subsequently apply a handle 7 to the tube 1 adjacent to the point of connection between the tube and the rod 4. The pointed extremity 5 of the rod is now forced into the earth and pressure applied to the handle 7 so as to force the connector downwardly, the handle being constructed in such manner as to be movable toward the upper end of the tube as the connector is worked into the earth. In the present instance, this handle is in the form of a metal bar which is provided with an opening between its ends through which the tube 1 is passed, such bar being provided with a set screw 8 adapted to be moved into the opening therein to engage the tube and so effect a rigid connection between the parts. After the ground plug or rod 4 has been passed into the earth the desired distance, the tube 1 is disconnected from the plug by rotating the same under the action of the handle 7. Subsequent to detaching the tube from the plug, the former is withdrawn from the ground and slipped off the wire, the upper end of the latter remaining above the earth, the plug remaining in the earth and forming a ground connector, as clearly illustrated in Fig. 4 of the drawing.

I claim:

A ground connector comprising a pointed cylindrical plug, a threaded nipple formed integral with one extremity of and of a diameter less than said plug so as to form a shoulder at their juncture, a conducting wire secured to said threaded nipple, a tube encircling said wire and having screw-threaded engagement with said nipple, said tube having one extremity tightly engaging the shoulder formed at the juncture of the nipple with the extremity of said plug, and a handle having detachable engagement with one end portion of said tube.

In testimony whereof I affix my signature in presence of two witnesses.

WILLIAM H. CURRY.

Witnesses:
C. H. GREEN,
JAMES H. CURRY.